Feb. 16, 1965   J. G. HARTGER   3,169,435
SAW FOR FERROUS MATERIALS
Filed Feb. 12, 1962

INVENTOR.
JOHN G. HARTGER
BY
ATTORNEYS

3,169,435
SAW FOR FERROUS MATERIALS
John G. Hartger, Grand Rapids, Mich., assignor to Oliver Machinery Company, Grand Rapids, Mich., a corporation of Michigan
Filed Feb. 12, 1962, Ser. No. 172,525
2 Claims. (Cl. 83—676)

This invention relates to saws for ferrous materials, and more particularly to a rotary saw construction which permits the continuous cutting of steel plate stock having a thickness on the order of several inches.

Steel plate of substantial thickness has customarily been cut in one of three ways: abrasively, by shearing, or by flame. The abrasive method is extremely slow and costly. Shearing produces severe permanent deformation stresses in the metal and is limited as to the thicknesses of plate that can be handled. Flame cutting is slow, inaccurate, and produces highly undesirable thermal stresses which have an adverse effect on the crystalline structure of the steel. All three methods require subsequent machining of the cut edge for accurate sizing. It has therefore long been desirable to cut steel plate with a rotary saw, much in the same manner as is done with wood and certain non-ferrous metals. Prior to the present invention, however, efforts at continuously sawing steel plate were doomed to failure because of the tendency of steel to close the cut and pinch the saw blade with destructive effects.

The present invention solves this problem and makes continuous steel plate cutting possible by so shaping the cutting teeth of the saw that they cut not only at the leading edge of the rotary blade, but also at its trailing edge. This effectively widens the cut at the trailing edge of the saw if it tries to close up, and thus prevents the workpiece from pinching the trailing edge of the saw and destroying it in the course of the cutting operation. The resulting cut is highly accurate and totally devoid of cutting stresses, and the optimum cutting speed is in excess of twice the fastest practical flame cutting speed.

It is therefore the object of the invention to provide a cutting tooth structure for rotary carbide tipped saw blades which permits the saw to cut not only with its leading edge but also with its trailing edge, regardless of its direction of travel.

It is another object of the invention to provide a rotary saw which can cut itself free when pinched by a workpiece.

These and other objects of the invention will best be understood from the following specification, taken in connection with the accompanying drawings in which.

Basically, the invention relates to the shape of the cutting teeth and particularly the brazed insert tips in a rotary saw for steel plate cutting, and consists of providing the teeth tips not only with an upper cutting edge, but also with a lower cutting edge spaced radially between the outer cutting edge means and the inner braze joint to be described. In this manner, the saw can cut itself free in any position as will be hereinafter described, yet will not pick up chips in the braze joint. Thus, the tooth construction of this invention not only prevents the saw from being pinched at its trailing edge as it travels forward, but also prevents the teeth from being overstressed and broken out if the saw is backed out of a partial cut.

Figure 1:
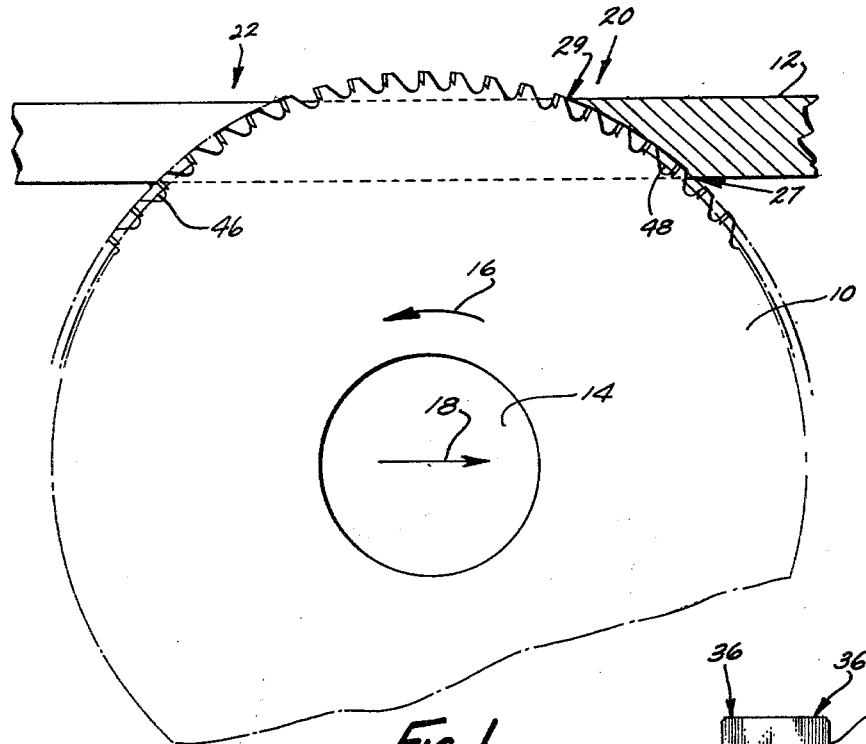
FIG. 1 is a side elevation of a saw blade such as may be used in connection with this invention, showing the relation of a typical workpiece thereto.

Referring now to the drawings, the general mode of operation of the saw of this invention is shown in FIG. 1. The object of the saw 10 is to cut the steel plate 12 as the saw blade rotates about shaft 14 in the direction of the arrow 16 while the shaft 14 moves forward in the direction of the arrow 18. In this condition, the area 20 will be referred to as the leading edge of the saw, and the area 22 will be referred to as the trailing edge of the saw.

Figure 2:
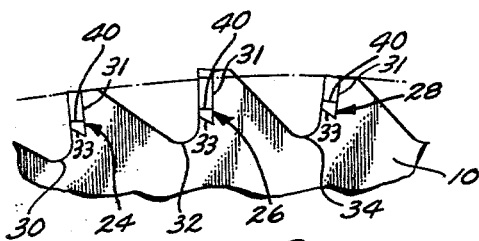
FIG. 2 is an enlarged fragmentary side elevation showing three successive teeth of the saw blade.
Figure 3:
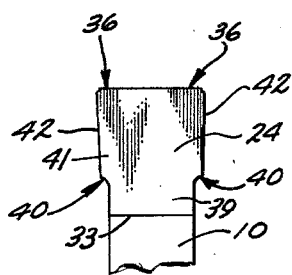
FIG. 3 is a front elevation of the left or right tooth in FIG. 2.
Figure 4:
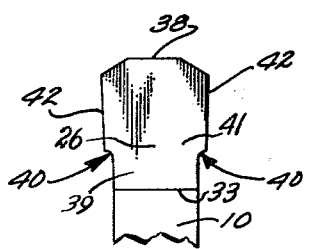
FIG. 4 is a front elevation of the center tooth of FIG. 2.
Figure 5:
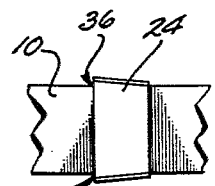
FIG. 5 is a plan view of the tooth of FIG. 3.
Figure 6:
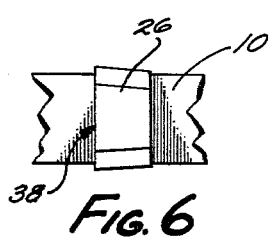
FIG. 6 is a plan view of the tooth of FIG. 4.

FIG. 2 shows the saw 10 in somewhat greater detail. It will be noted that teeth 24, 26, 28 are inserted in and brazed to the saw blade 10 along the surfaces 33, 31 adjacent the gullets 30, 32, 34. The surface 33 is inclined as best shown in FIG. 2 to reduce the pivot action of the cutting stresses on the brazed joint and thus strengthen the teeth. The teeth 24, 26, 28 are made from an extremely hard material such as carbide. Around the perimeter of the saw blade, straight teeth 24 such as shown in FIGS. 3 and 5 alternate with beveled teeth 26 such as shown in FIGS. 4 and 6. The straight teeth 24 cut the steel plate with their corner edges 36, whereas the beveled teeth 26 cut the steel plate with their center edge 38 as the blade enters the steel at 27 and leaves at 29.

According to the invention, both the straight teeth 24 and the beveled teeth 26 are provided with bottom cut grinds or edges 40 at points preferably located about two-thirds of the way downwardly along the side of the teeth 24, 26, 28. The bottom cutting edges 40 are formed by undercutting the bottom portion of the tooth to the thickness of the saw blade to produce a shank portion and a wider head portion. This location of the undercut prevents cut steel chips from laterally penetrating the joint 33 and prying it apart.

As will be noted in FIGS. 3 and 4, the sides 42 of the cutting teeth are slightly inclined downwardly and inwardly. This inclination is preferably on the order of one-half degree, which represents an optimum compromise design sufficient to prevent binding stress of the tooth on the principal cut without creating excessive stress on the secondary cut made by the bottom cutting edge.

In practice, the one-half degree angle is sufficiently small to cause a slight reverse cut which has a tendency to remove the surface irregularities left by the principal cut, and thus in effect to polish the cut surface. This polishing action is visible on the cut surface in the form of a pattern suggestive of a lapped surface. If for some reason, it should be desirable to obtain a rough cutting surface, this can be done merely by increasing the inclination of the sides 42.

From the above description, it will be evident that as the saw moves forward, i.e. in the direction of the arrow 18, it will make a major or principal cut along line 44 in FIG. 1. If the cut has a tendency to reclose behind the leading edge 20 of the saw, a minor or secondary cut will then be made by the bottom cutting edges 40 along line 46 (FIG. 1) to widen the principal cut sufficiently to prevent the workpiece 12 from binding the trailing edge 22 of the saw 10.

If the saw 10 is backed out of a partial cut, i.e. moved in a direction opposite to that of the arrow 18, the bottom cutting edges 40 will widen the cut along line 48. In this manner, binding of the saw is prevented on rearward movement also.

It will be understood that the basic principle representing the invention in this case can be carried out in many different ways which are deemed to fall within the inventive concept. Therefore, the present invention is not to

I claim:

1. A rotary saw for ferrous materials, comprising: a circular blade having a plurality of radially extending, circumferentially spaced teeth; said teeth each having adjacent back and bottom insert-receiving surfaces, and a radially extending insert tip having corresponding back and bottom surfaces brazed to said insert-receiving surfaces to form a back braze joint and a bottom braze joint; each of said tips having a shank portion and a radially outer head portion axially wider than said shank portion; said head portion having a radially outer cutting edge means and a pair of opposite radially inner cutting edges at the juncture of said head and shank portions; and said juncture and inner cutting edges being radially displaced from said bottom braze joint a substantial amount toward said outer cutting edge means, to prevent chips formed at said inner cutting edges from penetrating said bottom braze joint.

2. The saw in claim 1 wherein said inner cutting edges of said brazed tips are located about two thirds of the way between said outer cutting edge means and said bottom braze joint.

References Cited by the Examiner

UNITED STATES PATENTS

| | | | |
|---|---|---|---|
| 431,510 | 7/90 | Douglas | 143—140 |
| 1,132,592 | 3/15 | Lewis | 76—112 |
| 2,720,229 | 10/55 | Drake | 143—140 |

FOREIGN PATENTS

| | | |
|---|---|---|
| 1,116,949 | 2/56 | France. |
| 347,173 | 4/31 | Great Britain. |

ANDREW R. JUHASZ, *Primary Examiner.*

CARL W. TOMLIN, LEON PEAR, *Examiners.*